United States Patent [19]

Ligman et al.

[11] 4,107,995
[45] Aug. 22, 1978

[54] RECORDER FOR DECOMPRESSION DATA

[76] Inventors: James Raymond Ligman, 93 Manzanita Ln., Santa Barbara, Calif. 93105; Richard Fred Jones, 335 Rosemead, Santa Barbara, Calif. 93110

[21] Appl. No.: 722,710

[22] Filed: Sep. 13, 1976

[51] Int. Cl.² .................... G01F 23/18; G01L 9/00
[52] U.S. Cl. .................................... 73/300; 73/712; 73/753
[58] Field of Search .......... 73/391, 389, 300, 432 SD, 73/712, 753; 58/126 R, 145 R; 346/33 TP, 33 ME

[56] References Cited
U.S. PATENT DOCUMENTS

| | | | |
|---|---|---|---|
| 3,104,928 | 9/1963 | Hester | 346/33 TP |
| 3,696,610 | 10/1972 | Charbonnier | 58/145 R |

Primary Examiner—Donald O. Woodiel

[57] ABSTRACT

In underwater diving a record is made on an electronic recorder of the instantaneous pressure to which the diver is subjected at successive time intervals to give complete time-versus-pressure records for any one diver for a given time period, for example, twelve hours. A pressure transducer delivers an electronic signal to the recorder, and this pressure data is recorded at successive time intervals, for example, every minute of the twelve-hour period. The recorded data is read digitally and is read in analogue in the form of an x-y graph, either permanent or fleeting. The recorded data is preferably kept in permanent form on electronic chips also referred to as programmable read-only memories. The entire recording device can be carried by the diver, and the readout apparatus may be located at the surface of the water. Continuous topside monitoring is also provided.

16 Claims, 3 Drawing Figures

RECORDER FOR DECOMPRESSION DATA

Our invention relates to underwater diving and has particular reference to a recording mechanism that records the diver's depth pressures in water and decompression pressures as a function of time. Such data is the basis for decompression procedures and in permanent form gives monitoring and review capability to those in charge of diver safety.

BACKGROUND OF THE INVENTION

The major hazard faced by both commercial and sport divers is decompression sickness which results from the release of dissolved gases from the body tissues and blood as discrete bubbles when the ambient pressure is reduced too rapidly. As the ambient pressure on a diver is increased during a dive, the body tissues and blood begin to absorb more gas from the breathing mixture to reach equilibrium with the increased pressure. A certain percentage of these dissolved gases must be eliminated by the tissue and blood before the diver can return to the surface. Failing this elimination the diver is liable to extremely grave physiological disorders, known as "the bends," upon surfacing, and these disorders are capable of causing paralysis or even death.

The process of decompression consists in exposing the diver to graduated pressures that are successively lesser than the pressure at which he was diving. These lesser pressures can be achieved by the diver ascending to shallower depths and maintaining these depths for predetermined periods of time in accordance with decompression tables. At the lesser pressures (shallower depths) the dissolved gases come out of solution and are removed by the lungs of the diver. More commonly in commercial diving the diver is rapidly brought to the surface and then placed in a decompression chamber aboard a surface ship or boat. The pressure is successively lowered in the decompression chamber while the diver rests in less hazardous surroundings than the open water.

Underwater diving has proven to be extremely hazardous to the divers and improper decompression is one of the major hazards. Persons in charge of diving crews must have immediate data records of the lengths of time a diver has been exposed to various depths. The greater the depth, the greater the amount of dissolved gases and the greater the hazard from improper decompression. Exact time and depth records are therefore vital to safe diving operations. Additionally, there is a need for a permanent record of the time-pressure exposure of a diver when there has been a decompression accident, so that corrective measures can be taken. Public and private safety officials need such data, and heretofore this has not been available.

SUMMARY OF THE INVENTION

A pressure-responsive device delivers a signal to a recorder at regular time intervals. In this fashion data are stored in the recorder from which a time-pressure curve can be created. Preferably the pressure and time signals are electronic and the recorder is electronic. The daty and time of day of a diver is also preferably recorded, as well as the identification of the diver for the recorded data.

The recorder may be carried by the diver. Optionally, there may be an electrical connection to the surface where the time-pressure data may be monitored. Also, at the surface a recorder may receive this data, and the recorder may be scanned to produce a continuous time-pressure curve for the diver, either by video display or on a graph paper recorder or both. Similar readout apparatus may be used at any later time to create an x-y graph.

DESCRIPTION

Various objects, advantages, and features of the invention will be apparent in the following description and claims, considered together with the accompanying drawings forming an integral part of this specification and in which:

Figure 3:
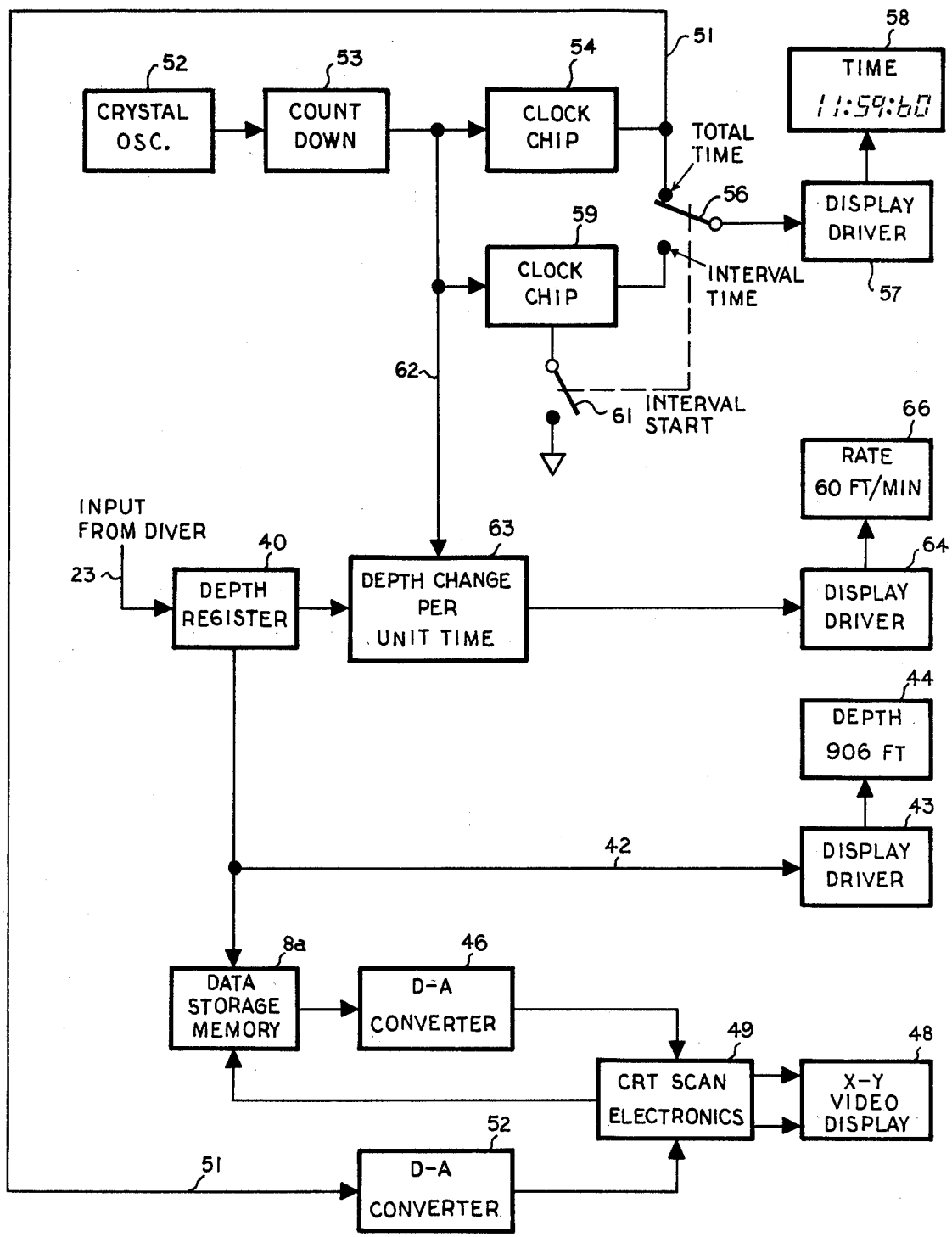

FIG. 3 is a schematic block diagram of apparatus which may be carried aboard a ship while the diver is diving and which receives depth signals from the diver's apparatus over an electrical conductor permitting digital display of the instantaneous time and pressure or depth and which also includes an electronic recorder which can be periodically scanned to produce an x-y graph curve of time versus pressure to which the diver is exposed.

Figure 1:
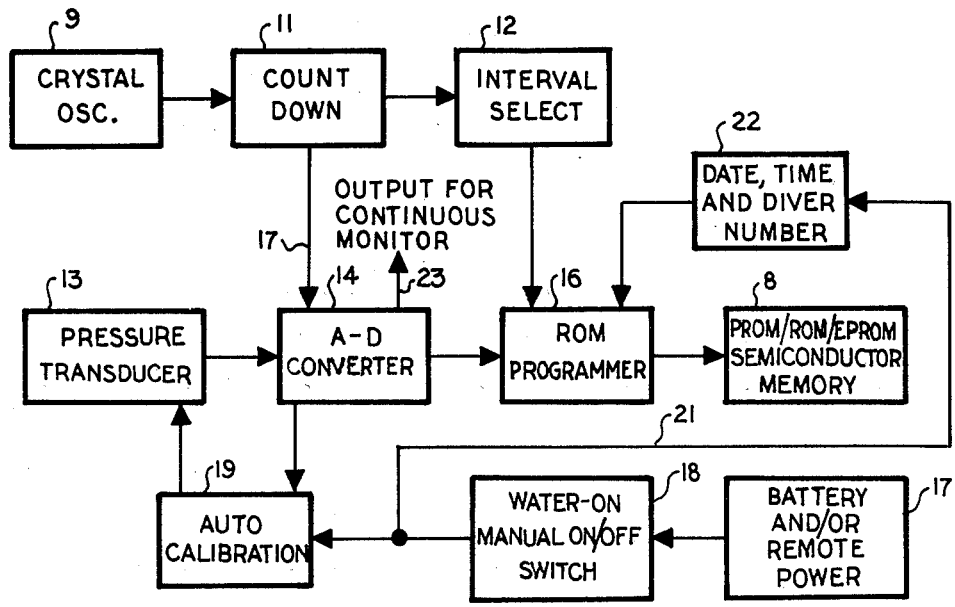
FIG. 1 is a schematic block diagram of a presently preferred apparatus to be carried by the diver to record on an electronic memory the pressure to which he is exposed as a function of time.

Referring now to FIG. 1, the apparatus there disclosed is miniaturized by virtue of recent technology so that the entire apparatus can be carried in a small pack not much larger than a package of cigarettes. This may be secured to the belt of the diver or to his helmet or to any other suitable location. Also the pressure data generated by the apparatus of FIG. 1 may be transmitted to the surface over an electrical conductor for continuous monitoring as will be described with reference to FIG. 3.

Referring to FIG. 1, the electronic memory of the apparatus is designated by the numeral 8, and the object of the apparatus there disclosed is to record data on this recorder. The type of recorder presently preferred is known as a PROM (programmable read-only memory) or a ROM (read-only memory) or an EPROM (erasable programmable read-only memory). These memories are generally known as semi-conductor memories. Any other suitable type of memory can be used, and we presently prefer to use digital-type memories. These memories are basically in the form of chips, and by stacking enough of these chips together a memory can be used which will have a twelve-hour capacity if data is impressed on the memory approximately every minute. These memories are well established and well known in the computer arts.

Referring now to the upper part of FIG. 1, the clock mechanism is indicated by the blocks 9, 11, and 12. The crystal oscillator 9 may have a frequency of output on the order of about three megahertz, and this frequency is reduced by the countdown circuit 11, also known as a divider circuit to deliver a lower frequency to the interval selector 12. We presently prefer to select out a time interval of 64 seconds. These clock mechanisms control the frequency at which pressure data is delivered to the memory or recorder 8. A pressure transducer 13 delivers its output to an analogue-to-digital converter 14, and this in turn delivers its output to a programmer circuit 16. The pressure transducer is presently preferred in the form of a solid-state device such as a pressure-sensitive transistor. These are off-the-shelf semiconductor devices that are well known in the art and deliver voltage dependent on pressure. This voltage is an analogue which must be converted to digital data in order to impress it upon the memory or recorder 8. This is the function of the converter 14, and we presently prefer to have this conversion made at a more rapid rate than the rate at which the memory or recorder receives data, and for this purpose a conductor 17 connects the countdown 11 with the converter 14. The digital data from converter 14 is delivered to the ROM programmer 16, which then delivers it to the recorder 8 at the time intervals determined by the interval select 12. The programmer 16 selects the pattern in which this digital data is impressed upon the semiconductor memory 8. The apparatus of FIG. 1 is powered by a battery or a remote power supply 17, and its power is controlled by a water switch 18, which closes only when the diver enters the water. This may be a conductivity-operated switch, and we presently prefer that once the switch is closed by the conductivity operation that it remains on for the entire life of the memory 8, for example, for a 12-hour period. Alternatively, a manual on-off switch can be used, but the water switch at present is preferred to be an on-switch only. The switch 18 delivers power to an autocalibration circuit 19, which sets all readings to zero as soon as the switch is actuated so that there will be a base in time of the instant that the diver strikes the water. Leading from the water switch 18 is a conductor 21 to a circuit which is in the form of an electronic watch or clock 22, which impresses digital data on the programmer 16 to identify the calendar date, the time in the 24 hours of the day, and the diver number. Leading from the AD converter 14 is a conductor 23, which may lead to the surface so that operators at the surface may continually monitor the depth or pressure data as a function of time.

The operation of the circuit of FIG. 1 is as follows: When the diver steps off the ship into the water the conductivity of the water operates the water switch 18, which delivers power from the source 17 to an autocalibration unit 19, which sets all the readings to zero. The autocalibration unit delivers power to the pressure transducer 13, which delivers an analogue signal to the analogue-digital converter 14, which converts this analogue signal to a digital signal, which is fed into the programmer 16, which then delivers the pressure signal to the recorder or electronic memory 8 at specific time intervals. These specific time intervals are selected by the interval select circuit 12, which receives oscillations from the crystal oscillator 9 and the divider 11, and the interval selected may be for example, every 64 seconds. Closing the water switch 18 also activates the watch or clock 22, which delivers a digital date and time and diver identification signal to the programmer, and this is impressed on the electronic recorder 8. The result of the operation of FIG. 1 is an electronic memory which has pressure data in a chronological sequence, and this data may be displayed by the apparatus of FIG. 2.

Figure 2:
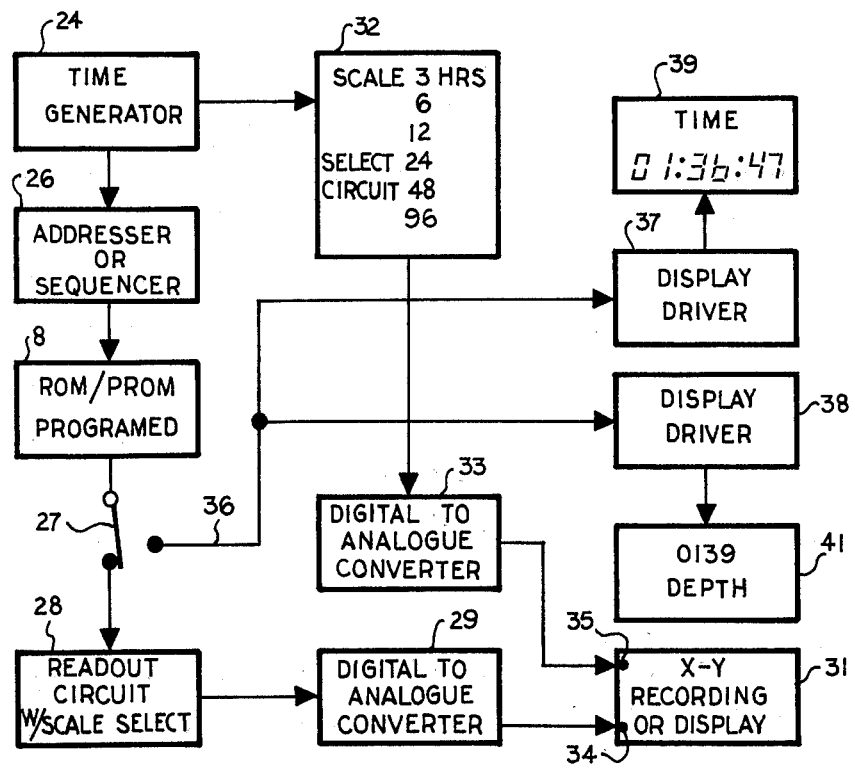
FIG. 2 is a schematic block diagram of a readout apparatus which can be used at any time after the diver ascends to the surface and which will produce either an x-y graph of the pressure versus time recorded in the recorder or can produce a digital display of the data stored.

Referring to FIG. 2, there is illustrated the mechanism for displaying the data in the recorder. The recorder 8 of FIG. 1 is disposed in the circuit of FIG. 2, and a suitable clock time generator or oscillator 24 is provided, which sends a timed impulse to an addressor or sequencer 26. The addresser sends an inquiry signal to the recorder 8 in the same pattern or sequence in which data was stored in the recorder 8. The digital output signal from the recorder 8 passes through a switch 27 to a readout circuit 28 having the capability of expanding or contracting the scale of the pressure readings or one of the coordinates of an x-y graph. The output of circuit 28 is digital and passes to a digital-to-analogue converter 29, which delivers an analogue signal to one terminal 34 of an x-y recording or display device 31. The time generator also delivers its signal to a time scale circuit 32 which can expand or contract the time input on the x-y curve. The output of the circuit 32 is digital and is fed to a digital-to-analogue converter 33, which delivers its signal to one of the x-y terminals 35 of the x-y recorder or display 31. The x-y recorder may be in the form of a graph on paper or it can be a temporary display such as on a video monitor or cathode ray tube.

Referring still to FIG. 2, there is illustrated an optional digital display of the data stored in the recorder 8. When the switch 27 is manually operated to connect the recorder 8 to a conductor 36, this signal travels to two display drivers 37 and 38 operating a time display 39 and a depth or pressure display 41. The time display will read from the time of start of recording, and the initial few minutes of operation will display also the date, the time of day, and the number of the diver. The depth display 41 may be calibrated in meters, feet, or any other suitable increment of depth, inasmuch as pressure is ordinarily related to depth.

The operation of FIG. 2 is as follows: The electronic recorder 8 of FIG. 1 is placed in the circuit of FIG. 2 as indicated. The time generator 24 generates a time signal at the same rate as that upon which the data was recorded in the recorder 8, and this time signal passes to the addresser or sequencer 26, which directs the inquiry signals into the same pattern or sequence in which the data was recorded. The output of the inquiry signal passes through switch 27 to the readout circuit 28, which has a scale select to enlarge or contract the coordinate of the x-y display having to do with pressure. This signal is a digital signal and needs to be converted to an analogue signal for an x-y display, and this is done in the converter 29, which delivers its output to one terminal 34 of the x-y coordinates of the display 31. The time coordinate may also be expanded or contracted by the scale circuit 32, and this output is fed to the converter 33, which delivers its output to the other terminal 35 of the x-y axis is recording. In this fashion the entire graph may be recorded or displayed as on a video screen for the entire time period within which data was impressed on the recorder 8. As mentioned previously we presently plan to use a 12-hour period. By selecting a scale of three hours any particular part of this 12-hour curve can be magnified or blown up for special scrutiny. If 48 hours is selected, then the time scale is compressed to give any desired result.

An optional feature of FIG. 2 is digital display of the instantaneous values of time and depth, and this is done by operating the switch 27 to connect it to conductor 36, which in turn is connected to display drivers 37 and 38. The signal from the recorder 8 being digital will register digitally as time on the register 39 and as depth on the register 41. As mentioned previously the circuit of FIG. 2 may be located at any place, either on shipboard or on land, and can be operated at any time subsequent to the dive so that the exact pressure-versus-time curve of any one twelve-hour period can be observed.

Referring to FIG. 3, there is illustrated the monitoring apparatus which is located topside or on the shipboard. The notations "topside" and "shipboard" refer to any station at the surface of the water, and this could be aboard a barge, ship, or boat, or if the diving were close to land could be located on land. The apparatus of FIG. 3 continuously monitors the data being obtained from the diver as to his depth. Referring to the lefthand part of FIG. 3, the input conductor 23 from the diver (FIG. 1) is delivered to a depth register 40 which holds just one point in time and when the next impulse from the diver is received the earlier impulse is erased and the new impulse is recorded. This temporary depth information is fed by a conductor 42 to a display driver 43, which energizes a digital depth display 44. This display, accordingly, will change once for every time period selected by the countdown 11 of FIG. 1, which can be more often than the sixty-four seconds selected for recording.

Referring still to FIG. 3, the information from the diver passes through the depth register 40 to a data storage or recorder 8a, which can be identical in all respects to the recorder 8 of FIG. 1. We presently prefer, however, to use an erasable memory for 8a, because the diver's memory 8 will ordinarily be a permanent memory. The purpose of this recorder at the shipboard or topside location is to permit scanning so that a video display or cathode ray tube display can be made in the form of an x-y graph. Accordingly, the data from memory 8a passes to a digital-to-analogue converter 46, which in turn passes a signal through a scan circuit 49 to a video display monitor 48. The scan circuit 49 is connected to the data storage or recorder 8a to sweep the entire length of recordings and thereby give one of the coordinates on the x-y display 48. The other coordinate is a time coordinate, and this is obtained from a separate clock mechanism located topside, but could if desired depend upon the clock carried by the diver as shown in FIG. 1. This clock output is fed through a conductor 51 to a digital-to-analogue converter 52 which supplies the time to the scan circuit 49 controlling the x-y display 48.

Referring now to the upper part of FIG. 3, there is illustrated the time mechanism in the form of a crystal oscillator 52 which is connected to a countdown or divider 53, which in turn is connected to a clock chip 54, which selects the exact time period desired, for example, sixty-four seconds. The conductor 51 previously mentioned is connected to this clock chip 54. The output of the clock chip 54 also passes through a switch 56 to a display driver 57, which drives a time display 58, which gives the complete elapsed time from the beginning of the dive. Moving the switch 56 downwardly causes it to engage the output of a second clock chip 59, which is used as an interval timer. The time display 58 will then show the time accounting from the instant the switch 56 is swung downwardly, which action also connects the clock chip 59 to ground through a switch element 61. This type of stopwatch information is useful when the decompression tables indicate that a diver should be at a particular depth only for a stated number of minutes and when this number of minutes appear on the time display 58 a telephone message is sent to the diver to stop his work and to start his ascent.

The countdown or divider 53 of the clock mechanism also supplies a signal through a conductor 62 to a depth-change comparator 63. This comparator gives a rate of ascent or descent, and its output is delivered to a display drive 64, which in turn drives a rate indicator 66.

The operation of FIG. 3 is as follows: The equipment of FIG. 3 is located topside, and a signal from the diver reaches this equipment through the conductor 23 in the form of timed digital signals, which indicate instantaneous pressure and therefore the depth of the diver. These signals are temporarily stored in the depth register 40 and are conducted over the conductor 42 to the display driver 43, which displays instantaneous depth on the display 44. Signals from the register 40 also go to the data storage 8a, which has the capacity of storing several hours or more of data and preferably has the same storage capacity as the permanent memory 8 of FIG. 1. This data stored in 8a is in digital form and is converted into analogue form in the circuit 46, which transmits this analogue information through the scan circuit 49, which delivers it to one of the coordinates of the x-y video display 48. The scan circuit is also connected directly to the memory 8a for the purpose of sweeping the entire time period of the memory. The other coordinate of the video display 48 is obtained by time signal over conductor 51 passing through the converter 52 to the scan circuit 49, which in turn delivers it to the other coordinate of the display 48.

Referring now to the upper part of FIG. 3, the three clock units 52, 53, and 54 generate time signals, and the one from 53 passes through a conductor 62 to the circuit 63, which compares change of depth with time to give a signal to a display drive circuit 64, which in turn drives a rate display 66.

The circuit of FIG. 3 also has a lapsed time feature to aid in the control of the diver's decompression. The operator switches switch 56 to the lower terminal of the switch, which enables the clock 59 to pass a time signal to the driver display 57, which in turn causes time to be registered from the instant of the movement of the switch to that lower terminal. In this fashion a topside controller can communicate with the diver when a predetermined elapsed time of dive has occurred in accordance with decompression tables, after which the diver must ascend for the purpose of decompression.

The circuit of FIG. 3 also gives an instantaneous depth display by virtue of a signal from the depth register 40 passing through the conductor 42 to the display driver 43, which then causes the display 44 to give the instantaneous depth signal. Since the depth register 40 is in digital form and the display is in digital form, there is no need for a converter.

We have found that a suitable type of memory for twelve-hour storage at input intervals of sixty-four seconds is a 4K-bipolar PROM organized 4 × 1024. Various manufacturers make such devices, including National Semiconductor, SIGNETICS, Harris Semiconductor, and Texas Instruments. The pressure response of the device 13 of FIG. 1 is in the form of a pressure-responsive transistor, and we have used the 1400 series and the 1700 series of National Semiconductor. The water switch 18 of FIG. 1 is of the type that depends on conductivity of water to turn it on, but does not depend on conductivity to keep the contact. Once the switch is on, all current is taken off of the water conductivity so that there will be no interaction with the metal of the switch. The autocalibration circuit 19 of FIG. 1 sets the circuit to zero, for example, ties down the response of the pressure transducer 13 to a particular time period, even though the transducer itself might change its zero with a period longer than 12 hours. The addresser of sequencer 26 of FIG. 2 is common in the computer arts. The depth register 40 of FIG. 3 receives information in serial form from the wire 23 and is capable of storing it until the next time interval for a new signal or piece of information over the wire 23. It has the capacity for parallel output to the display driver 43 as soon as an entire signal has been received by the register.

While we have described our apparatus with respect to presently preferred forms thereof we do not limit ourselves to these particular circuits, apparatus, or special modes of operation, but we include within the scope of the following claims all variations and modifications that fall within the true spirit and scope of our invention. For example, the recorder could give the exact hour, minute, and second of each depth signal but we presently believe that this is not necessary. The time intervals from 24 of FIG. 2 could be any multiple of the recording time intervals, including a multiple of one or less.

We claim:

1. A system for monitoring on shipboard and recording the pressure to which an underwater diver is subjected as a function of time, comprising:
   (a) a shipboard display device for indicating time and pressure;
   (b) a pressure transducer carried by the diver and having an electronic output that is conducted to the shipboard pressure display;
   (c) a clock having a periodic electronic output located at one of said diver or shipboard locations and connected to said shipboard time display;
   (d) and an electronic recorder located at one of said diver or shipboard locations and connected to said pressure transducer and said clock to record periodically the instantaneous pressure,
whereby the instantaneous pressure and time are observed on shipboard and a record of pressure versus time is obtained on the recorder for any selected period of time.

2. A system as set forth in claim 1 wherein a recorder is located at the diver and a recorder is located on shipboard and both are connected to the pressure transducer and to a clock, and scanning apparatus is located on shipboard and connected to the shipboard recorder and the display device to give a graph of the time versus pressure.

3. A system as set forth in claim 2 wherein the display device is a video display.

4. A system as set forth in claim 1 wherein a second clock is provided and located at shipboard, and a manual switch connects it to the time display to give an indication of a particular segment of time during a dive to aid in control of decompression.

5. A system as set forth in claim 1 wherein a circuit compares change in pressure as a function of time to give an output signal proportional to rate of change of pressure.

6. A system for monitoring and recording as set forth in claim 1 wherein the electronic recorder is a digital electronic recorder.

7. A recorder to record time versus pressure for an underwater diver, comprising:
   (a) a clock having a periodic electronic output signal;
   (b) a pressure transducer carried by the diver and having an electronic output signal and connected to the clock to give a periodic pressure signal;
   (c) and an electronic recording device connected to the pressure transducer to store the periodic pressure signals;
to thereby form a continuous time-pressure record of the time at which a diver is exposed to various pressures.

8. A device according to claim 7 wherein the clock is normally not transmitting time signals, and transmission is activated by a water switch carried by the diver, which is closed by contact with water.

9. A device according to claim 7 wherein the clock registers day and hour on the recording device in addition to continuous time signals.

10. A device according to claim 7 wherein the diver's identity is electronically registered on the recording device.

11. A device according to claim 7 wherein the diver's identity is electronically registered on the recording device.

12. A recorder as set forth in claim 7 wherein the electronic recording device is a digital electronic recording device.

13. A recorder readout for a digital electronic recorder of decompression data wherein instantaneous pressure data has been recorded at specified time intervals comprising:
   (a) an $x-y$ display device having one terminal for analogue signals for each of said $x-y$ and $y$ coordinates;
   (b) a clock connected to one of said display terminals creating time signals at intervals at a multiple of said time intervals of said digital electronic recorder;
   (c) an addresser connected to said digital electronic recorder to direct inquiry signals to said digital electronic recorder in the same pattern as the recorded data was received;
   (d) a connection from the addresser to the clock output to send inquiry signals to said recorder at a multiple of the time intervals at which data was recorded;
   (e) and a digital-to-analogue converter connected to said recorder to receive the output of the inquiry signals and connected also to the other coordinate terminal of the $x-y$ display device,
whereby an $x-y$ display is made of the recorded data versus time.

14. A recorder readout as set forth in claim 13 wherein there is a digital time display connected to said clock and a digital pressure display connected to the output signals of the digital electronic recorder to give instantaneous digital display of the data being supplied to the $x-y$ display device.

15. Diver-monitoring apparatus for obtaining decompression data, comprising:
   (a) a shipboard recorder for time and pressure signals;
   (b) a clock connected to the recorder to give a time coordinate;
   (c) and a pressure transducer carried by the diver and having an output connected to the recorder,
whereby instantaneous pressures are recorded chronologically to establish a time-pressure curve to show the time duration of various pressures to which the diver is exposed.

16. Apparatus for the remote display of data of conditions under which a diver has operated that have been recorded on a digital electronic recorder at specified time intervals, comprising:

(a) a display device having $x$ and $y$ coordinates and having a terminal for analogue signals for each of said $x$ and $y$ coordinates;

(b) a clock having periodic electronic output signals and connected to one of said display terminals;

(c) an addresser connected to said digital electronic recorder to direct inquiry signals to said digital electronic recorder in the same pattern as the recorded data was received;

(d) a connection from the clock output to the addresser to send periodic inquiry signals to said recorder;

(e) and a digital-to-analogue converter connected to said recorder to receive the response of the inquiry signals and connected also to the other coordinate terminal of the $x$–$y$ display device, whereby an $x$–$y$ display is made of the data versus time.

* * * * *